United States Patent [19]

Francis

[11] Patent Number: 4,898,427

[45] Date of Patent: Feb. 6, 1990

[54] NEUTRAL STOP DEVICE

[75] Inventor: David W. Francis, Canfield, Ohio

[73] Assignee: Commercial Intertech Coporation, Youngstown, Ohio

[21] Appl. No.: 277,763

[22] Filed: Nov. 30, 1988

[51] Int. Cl.$^4$ .............................................. B60P 01/16
[52] U.S. Cl. .............................. 298/22 C; 137/625.34
[58] Field of Search .................. 137/625.34; 298/17 B, 298/22 C

[56] References Cited

U.S. PATENT DOCUMENTS

| | | | |
|---|---|---|---|
| 1,353,244 | 9/1920 | Joerns | 60/462 |
| 2,782,946 | 2/1957 | Hough | 414/711 |
| 2,811,016 | 10/1957 | McRae | 60/52 |
| 3,017,862 | 1/1962 | Freist | 121/41 |
| 3,128,677 | 4/1964 | Tennis | 91/383 |
| 3,534,679 | 10/1970 | Forichon | 100/52 |
| 4,003,601 | 1/1977 | Gerding | 298/22 |
| 4,029,359 | 6/1977 | Glomski | 298/22 |

FOREIGN PATENT DOCUMENTS

| | | | |
|---|---|---|---|
| 57-186537 | 11/1982 | Japan . | |
| 59-18033 | 1/1984 | Japan | 298/22 C |
| 400463 | 10/1933 | United Kingdom . | |

Primary Examiner—Robert J. Spar
Assistant Examiner—Janice Krizek
Attorney, Agent, or Firm—Buchanan Ingersoll

[57] ABSTRACT

A neutral stop device is provided which prevents the accidental lowering of a truck bed when the spool of the hydraulic valve system is positioned in a neutral location and any force acts on a pull-out cable running from the spool to the truck bed. A stop device is provided having two annular rings, each of which surround a different end of the spool, said rings being connected by a spacer means. Each of the annular rings is adapted to interact with a snap ring provided on the end of the spool to restrict the movement of the spool to a preselected range. The stop device is activated by a cable attached to the truck bed and is moved to a position which prevents the spool from moving from a raise location to a lower location.

7 Claims, 1 Drawing Sheet

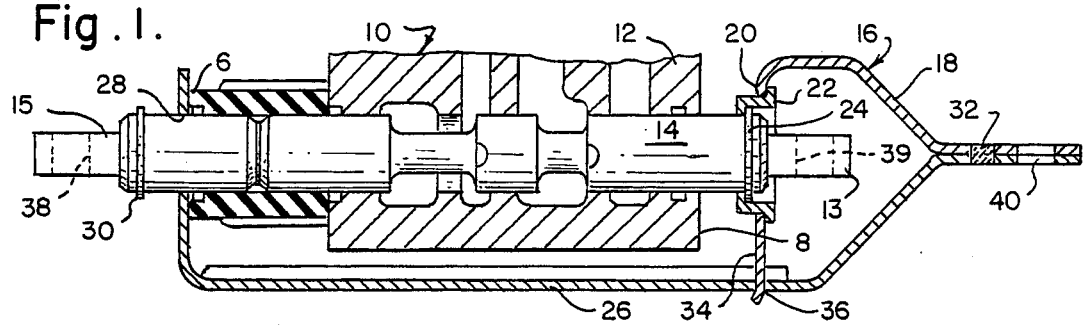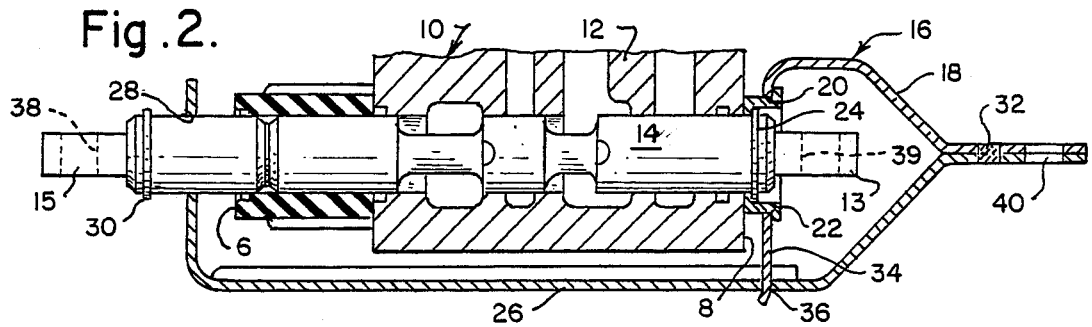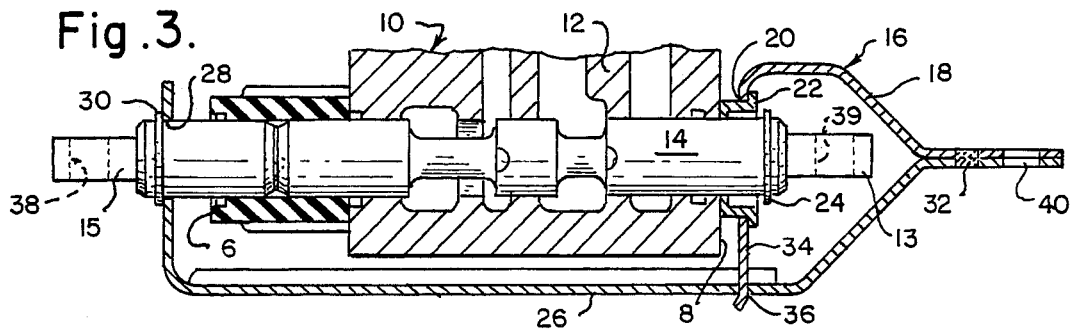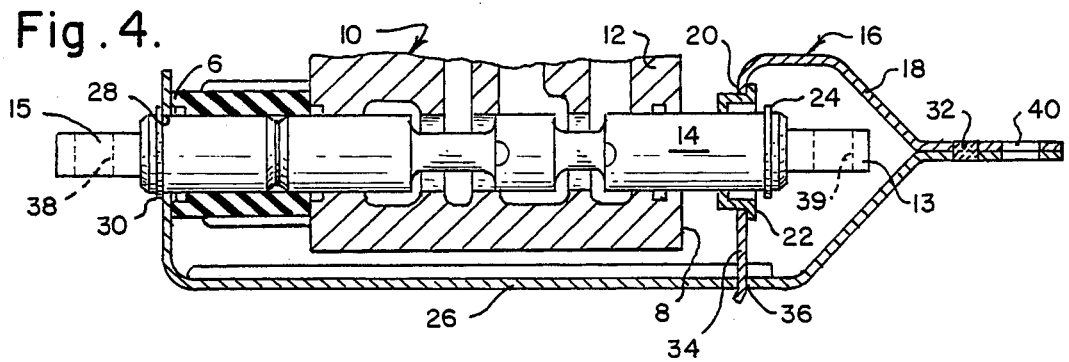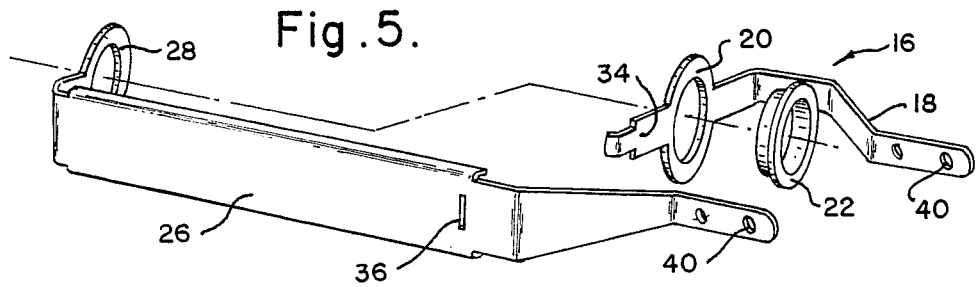

NEUTRAL STOP DEVICE

BACKGROUND OF THE INVENTION

1. Field of the Invention

This invention relates to the field of hydraulic mechanisms used primarily for, but not limited to, raising and lowering truck beds. More particularly, this invention relates to a neutral stop device provided to prevent accidental lowering of the truck bed.

2. Description of the Prior Art

Hydraulic mechanisms have long been used to raise and lower the truck bed of a dump truck. Generally, a spool moves within a hydraulic valve between a raise location wherein the flow of hydraulic fluid to a cylinder raises the truck bed and a lower location wherein the flow of hydraulic fluid from the cylinder lowers the truck bed. Preferably, a neutral location is provided wherein there is no flow of hydraulic fluid to the cylinder and the truck bed remains stationary. A control means is provided to adjust the spool among its raise, neutral and lower locations. Often, a pull-out cable is provided which is fastened to the dump truck body and one end of the valve spool. This cable is adjusted so that when the truck bed reaches its maximum desired height, the cable moves the spool out of the raise location.

When the truck bed is in the raised position, the pull-out cable may be exposed. If a worker servicing the truck bed accidentally engages the cable, the spool could be moved from its neutral location to its lower location, causing the truck bed to fall. This causes a potential safety risk to a worker servicing the truck bed. Consequently, there is a need for a safety device which prevents the accidental lowering of a raised truck bed.

A safety device to prevent inadvertent transmission of forces from the pull-out cable to the spool is disclosed in Glomski, U.S. Pat. No. 4,029,359. A hollow hub extends from the valve housing and holds a sleeve which is slidingly engaged therein. The sleeve is connected to the spool and can move the spool to the neutral location when the pull-out cable is engaged. Stop means provided in the hub prevent the pull-out cable from further extending the sleeve. The hollow hub is fixed to the housing and forms an integral part thereof.

Because the hollow hub is an integral part of the housing, the Glomski safety device cannot be used as a field replacement for a hydraulic valve having no safety device. To use the Glomski safety device, one might replace the entire hydraulic valve mechanism. Thus, there is a need for a safety device which can be added to existing hydraulic valve mechanisms to prevent the accidental lowering of a raised truck bed.

SUMMARY OF THE INVENTION

I provide a neutral stop device which can be added to most every dump truck hydraulic system. The stop device has an adjustable bracket which prevents the accidental movement of the spool beyond a preselected range. The bracket includes a pair of annular rings connected by a spacer means. The annular rings are sized and positioned to permit the spool to pass therethrough.

The annular rings are positioned opposite each other on either end of the spool. Stop means, such as snap rings or other members having a shoulder greater in diameter than the diameter of the annular ring, provided on each end of the spool interact with each of the annular rings to limit the movement of the spool. Activating means, such as a pull-out cable, is used to adjust the bracket between a raise/lock and a neutral/lock position. The bracket is sized so that the neutral/lock position is defined when a first annular ring abuts a side of the valve housing and the raise/lock position is defined when the second annular ring abuts the opposite side of the valve housing.

In operation, the spool is adjusted from its neutral location to its raise location which moves the bracket into its raise/lock position. After the truck bed is fully raised, the spool may be moved to the neutral location. Further movement of the spool to the lower location, when the pull-out cable is activated, is prevented by the bracket. To lower the truck bed, the bracket must first be moved to its neutral/lock position and the control means activated to put the spool in the lower location. Once the truck bed is fully lowered, the spool is moved to the neutral location.

By using the bracket to provide a stop, the control means must be engaged before the truck bed will lower. The control means may be a cable, mechanical linkage or an air activated device.

My stop device can be added to any dump truck hydraulic system of the type in which each end of the spool remains exposed outside the valve housing at all times. In a preferred embodiment, the stop device contains only three components and is easy to apply. My stop device can be used to retrofit most every dump truck, thereby enhancing the safety of the truck.

BRIEF DESCRIPTION OF THE DRAWINGS

FIG. 1 is a front sectional view of the stop device of the present invention fitted on a spool valve showing the spool in the neutral location and the stop device in the neutral/lock position.

FIG. 2 is a front sectional view similar to FIG. 1 showing the spool in the raised location and the stop device in the raise/lock position.

FIG. 3 is a front sectional view similar to FIG. 1 showing the spool in the neutral location and the stop device in the raise/lock position.

FIG. 4 is a front sectional view similar to FIG. 1 showing the spool in the lower location and the stop device in the neutral/lock position.

FIG. 5 is an exploded view of the stop device of FIG. 1.

DESCRIPTION OF THE PREFERRED EMBODIMENTS

FIGS. 1 through 5 illustrate my neutral stop device 16 fitted on a hydraulic valve mechanism 10. Spool 14 moves within hydraulic valve housing 12 having opposite sides 6 and 8. Spool 14 adjusts the hydraulic system among raise, lower and neutral locations. FIG. 2 shows the spool 14 in the raise location; FIG. 4 shows the spool 14 in the lower location; and FIGS. 1 and 3 show the spool 14 in the neutral location. Control means (not shown) are provided in the cab of the truck to adjust spool 14 to the appropriate location within valve housing 12. The control means are attached to clevis hole 38 provided on end 15 of spool 14.

Stop device 16 includes first elongated member 18 and second elongated member 26. First elongated member 18 attaches to annular ring 20. Annular ring 20 is sized and positioned to allow spool 14 to pass therethrough. Fastener ring 22 is fitted into annular ring 20. Second elongated member 26 attaches to annular ring 28. Annular ring 28 is sized and positioned to allow spool 14 to pass therethrough.

My stop device 16 is sized so that it can be set in one of two positions. In a first position, the neutral/lock position, annular ring 28 abuts side 6 of valve housing 12. In a second position, the raise/lock position fastener ring 22 on annular ring 20 abuts side 8 of valve housing 12.

Elongated member 18 and elongated member 26 are connected by fastening means 32. Preferably, fastener means 32 is a weld, although any fastener such as a stud or bolt is acceptable. Elongated member 18 and elongated member 26 are sized to maintain a constant distance between annular ring 20 and annular ring 28. Alternatively, elongated member 18 and elongated member 26 may be in the form of a single piece which maintains a constant distance between annular ring 20 and annular ring 28.

I provide extended tab 34 on annular ring 20 opposite elongated member 18. Tab 34 is adapted to fit into slot 36 provided in elongated member 26 Tab 34 and slot 36 provide a second point of attachment between elongated members 18 and 26. Among other benefits, this second point of attachment increases the sturdiness of the stop device 16 so that it can be easily moved along spool 14.

A pull-out cable, previously attached to clevis hole 39 on end 13 of spool 14, connects the truck bed to attachment means 40 provided on stop device 16. The pull-out cable is adjusted to position my stop device 16 in the neutral/lock position when the truck bed attains a maximum desired height.

Snap ring 24 is attached to end 13 of spool 14 outside of fastener ring 22 and is sized such that it has a diameter greater than that of the inner diameter of fastener ring 22. Consequently, as fastener ring 22 is pulled away from side 8 of valve housing 12, it will contact snap ring 24 and move spool 14 accordingly. Likewise, when snap ring 24 is moved toward side 8 of valve housing 12, it will contact fastener ring 22 and move stop device 16 accordingly.

Snap ring 30 is attached to end 15 of spool 14 outside of annular ring 28 and is sized such that it has a diameter greater than that of the inner diameter of annular ring 28. When snap ring 30 is moved toward side 6 of valve housing 12, it will contact annular ring 28 and move the stop device 16 accordingly.

In operation, a truck, utilizing my neutral stop device 16 would be transported with spool 14 and stop device 16 in the location and position shown in FIG. 1. In this position, spool 14 is in a neutral location and stop device 16 is in a neutral/lock position.

When the truck bed is raised, the control means moves spool 14 to the raise location. As spool 14 moves, snap ring 24 engages fastener ring 22 and moves stop device 16 to the raise/lock position shown in FIG. 2. Now fluid may flow for raising the truck bed.

Once the truck bed has attained the desired raised position, spool 14 may be moved to the neutral location by the control means. The stop device 16 may remain in the raise/lock position. FIG. 3 shows spool 14 and stop device 16 in such a position.

Alternatively, the pull-out cable moves stop device 16 to the neutral/lock position when the truck bed attains the desired maximum height. Because of the contact between fastener ring 22 and snap ring 24, spool 14 is moved to the neutral location. In this position, shown in FIG. 1, if the pull-out cable is accidentally engaged, stop device 16 will not move because of the engagement of annular ring 28 and side 6 of valve housing 12. In this manner, stop device 16 prevents spool 14 from being accidentally moved to the lower location 8.

To lower the truck bed, spool 14 is moved to the lower location by the control means. Movement of the spool causes snap ring 30 to engage annular ring 28 and move stop device 16 to the neutral/lock position. This is shown in FIG. 4. Once the truck bed is lowered, the spool is moved to the neutral location and the stop device is retained in the neutral/lock position. This is the same arrangement as in FIG. 1.

By moving the pull-out cable from clevis hole 39 located on end 13 of spool 14 to hole 40 in stop device 16, I have eliminated the possibility that the accidental engagement of the pull-out cable will cause spool 14 to move to its lower location. In this manner, my stop device 16 provides a neutral stop which enhances the safety of a hydraulic dump truck.

As shown in FIG. 5, my stop device 16 can be assembled by adding only three parts to an existing hydraulic system. Because it is not attached to valve housing 12, stop device 16 can be applied to most every dump truck hydraulic system. The only requirement is that the hydraulic system have a spool 14 having ends 13 and 15 which remain exposed outside valve housing 12 at all times. Various sizes of annular rings 28 may be provided so that a variety of hydraulic systems having different spool sizes may be fitted with my stop device.

To retrofit an existing hydraulic system, annular ring 28 is placed over end 15 of spool 14 and snap ring 30 is applied thereon. The pull-out cable which is connected to the spool at end 13 is disconnected. Annular ring 20 is then placed over end 13 of spool 14. If needed, fastener ring 22 is then inserted over end 13 and snap ring 24 is applied to the spool 14. Fastener ring 22 is fitted into annular ring 20 to complete the assembly of my stop device 16. Then, the pull-out cable which was disconnected from end 13 of spool 14 is connected to attachment means 40 on stop device 16.

While I have shown and described a present preferred embodiment of the invention, it is to be distinctly understood that the invention is not limited thereto but may be otherwise variously embodied and practiced within the scope of the following claims.

I claim:

1. A neutral stop device to prevent the accidental lowering of a truck bed for use on a hydraulic valve of the type having a spool whose opposite ends are both exposed outside the hydraulic valve housing during normal operation of the valve comprising:

(a) a first annular ring sized and positioned to permit a first end of the spool to pass therethrough and to prevent stop means provided on the first end from passing therethrough;

(b) a second annular ring sized and positioned to permit a second end of the spool to pass therethrough and to prevent stop means provided on the second end from passing therethrough;

(c) spacer means connected to and between the first annular ring and the second annular ring to maintain the first ring and the second ring a constant distance apart so that when the annular rings are fitted over the spool and each ring is positioned between a stop means and the valve housing the device will prevent the spool from being moved to a location which lowers the truck bed by any force acting on a pull-out cable connected to the device; and (d) means for attaching the pull-out cable to one of the annular rings and the spacer means.

2. The stop device of claim 1 also comprising a cable connected to the truck bed which moves the stop device when the truck bed is raised to a maximum desired height.

3. The stop device of claim 1 wherein each of the stop means comprises a snap ring provided on each end of the spool.

4. The stop device of claim 1 wherein at least one of the annular rings having an opening of a given diameter and also comprising a fastener ring adapted to fit within the opening of the annular ring to restrict the diameter of the opening.

5. The stop device of claim 1 wherein the spacer means comprises a first elongated member connected to the first annular ring, a second elongated member connected to the second annular ring, and means to connect the first elongated member and the second elongated member.

6. The stop device of claim 5 wherein said means to connect is one of a weld, a bolt and a fastener.

7. An improved dump body mechanism having a tiltable dump body and means for raising and lowering the body, there being a hydraulic circuit and a valve in the hydraulic circuit for controlling the flow of fluid into and out of a hydraulic cylinder, the valve including a housing and a shiftable spool having ends which extend through opposite sides of the valve housing and having a raise location in which fluid is routed to the cylinder to operate the cylinder to raise the dump body, a neutral location in which fluid bypasses the cylinder to hold the body in a raised position, and a lower location in which fluid is routed from the cylinder to operate the cylinder to lower the dump body, there being means to shift the spool, the improvement comprising (a) a first annular ring sized and positioned to permit a first end of the spool to pass therethrough and to prevent stop means provided on the first end from passing therethrough;

(b) a second annular ring sized and positioned to permit a second end of the spool to pass therethrough and to prevent stop means provided on the second end from passing therethrough;

(c) spacer means connected to and between the first annular ring and the second annular ring to maintain the first ring and the second ring a constant distance apart so that when the annular rings are fitted over the spool and each ring is positioned between a stop means and the valve housing the device will prevent the spool from being moved to a location which lowers the truck bed by any force acting on a pull-out cable connected to the device; and (d) means for attaching the pull-out cable to one of the annular rings and the spacer means.

* * * * *

UNITED STATES PATENT AND TRADEMARK OFFICE
CERTIFICATE OF CORRECTION

PATENT NO. : 4,898,427

DATED : February 6, 1990

INVENTOR(S) : DAVID FRANCIS

It is certified that error appears in the above-identified patent and that said Letters Patent is hereby corrected as shown below:

On the title page:
At [73], Assignee, change "Coporation" to --Corporation--.

Signed and Sealed this

Fifth Day of March, 1991

Attest:

HARRY F. MANBECK, JR.

Attesting Officer     Commissioner of Patents and Trademarks